A. LEVEDAHL.
DRIVING GEAR FOR MOTOR CYCLES.
APPLICATION FILED JAN. 17, 1908.
899,746.
Patented Sept. 29, 1908.
4 SHEETS—SHEET 1.
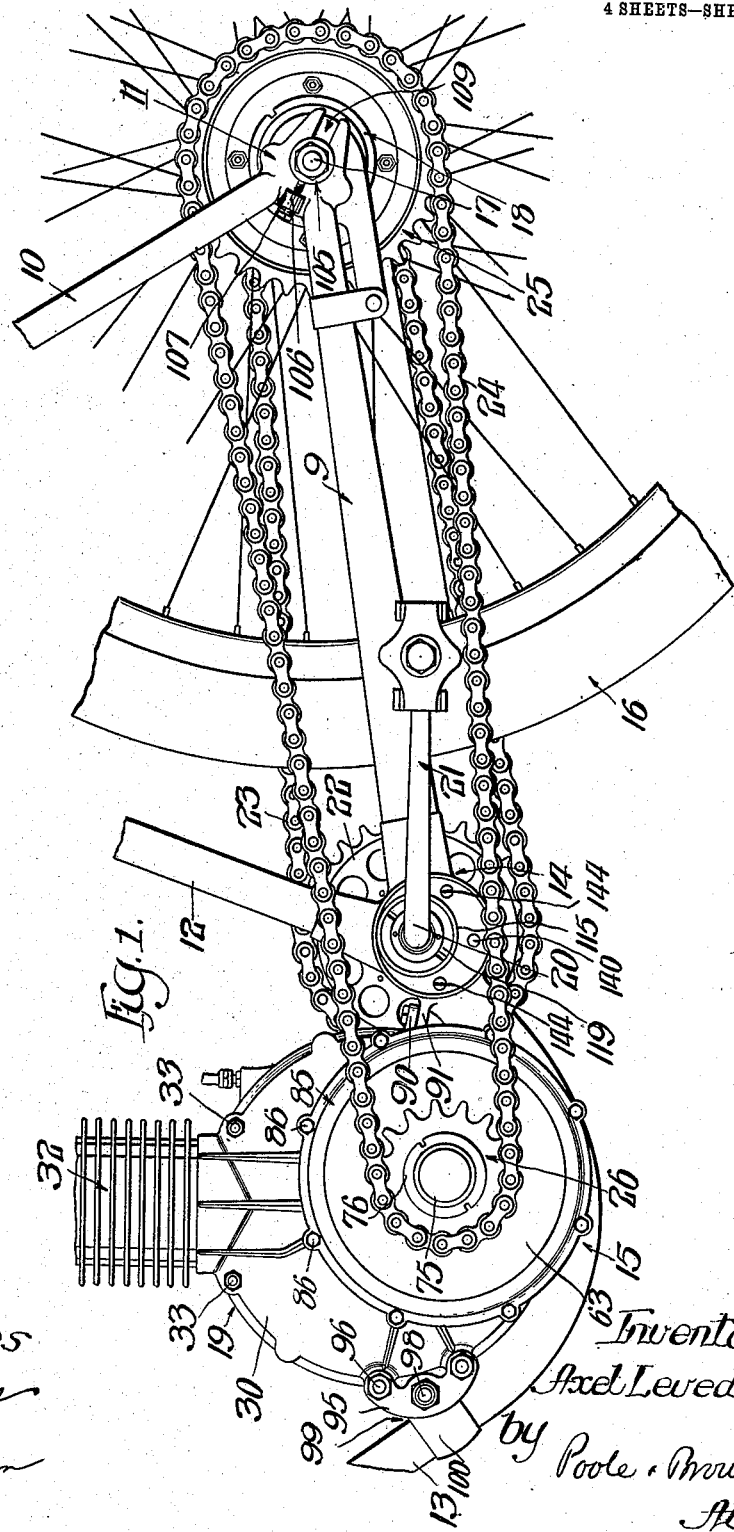

A. LEVEDAHL.
DRIVING GEAR FOR MOTOR CYCLES.
APPLICATION FILED JAN. 17, 1908.
899,746.
Patented Sept. 29, 1908.
4 SHEETS—SHEET 2.
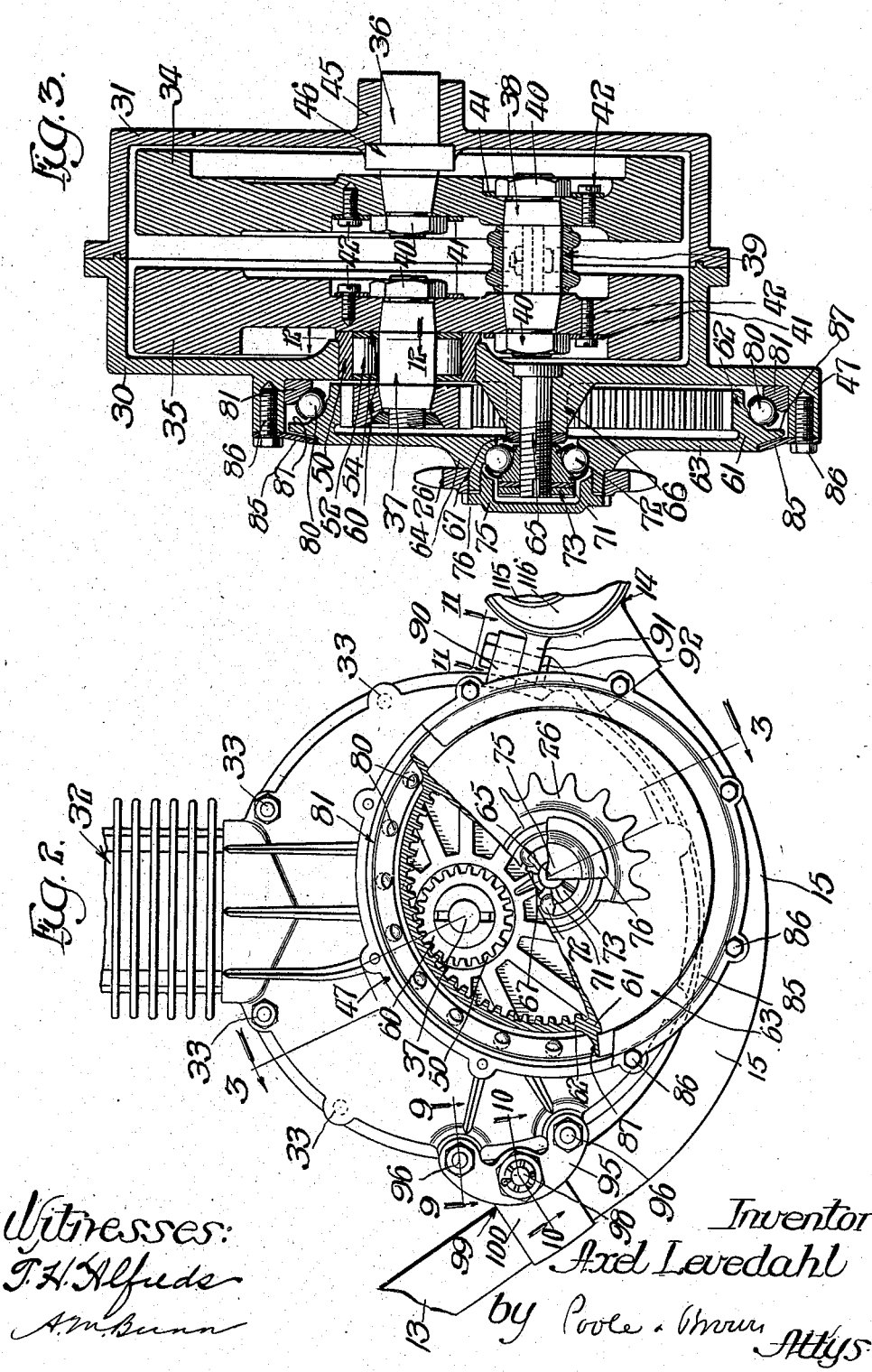
Witnesses:
T. H. Alfreds
A. M. Bunn
Inventor
Axel Levedahl
by Poole & Brown Attys

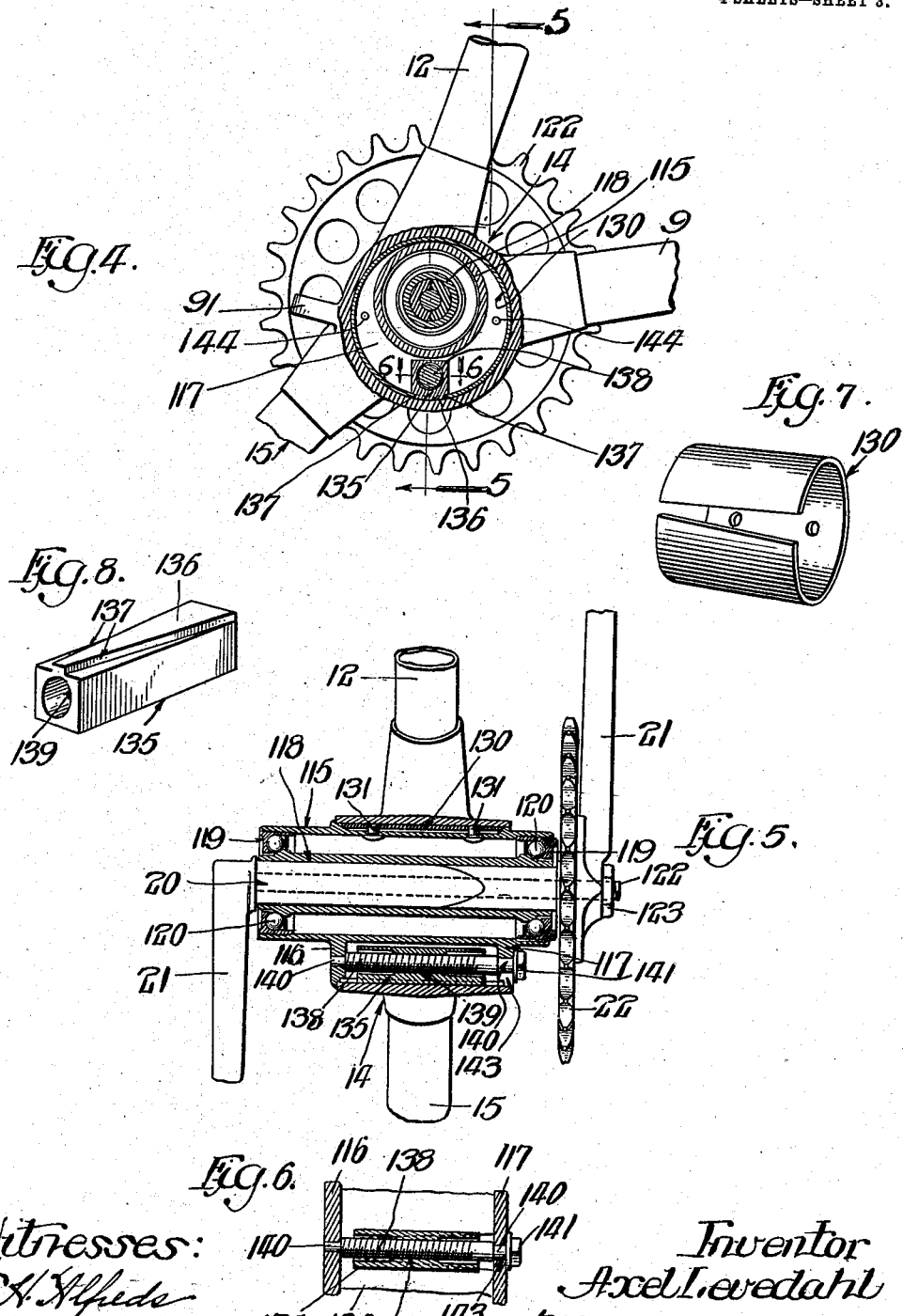

A. LEVEDAHL.
DRIVING GEAR FOR MOTOR CYCLES.
APPLICATION FILED JAN. 17, 1908.
899,746.
Patented Sept. 29, 1908.
4 SHEETS—SHEET 4.
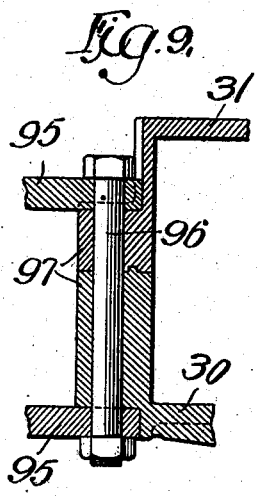
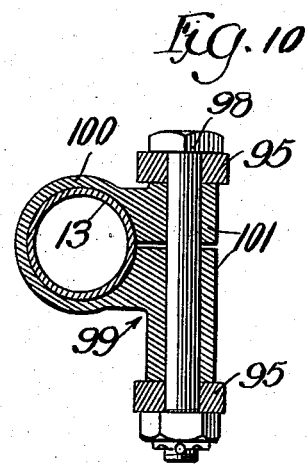
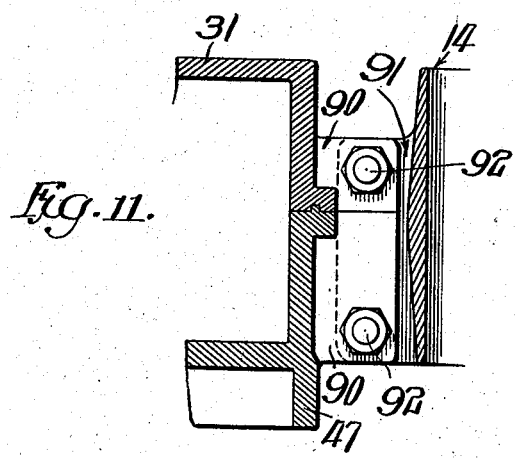
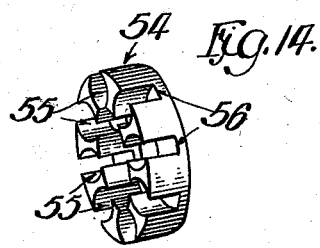
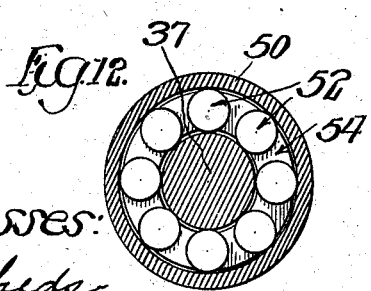
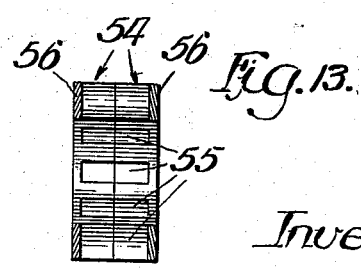
Witnesses:
Inventor
Axel Levedahl
by Poole, Brown Attys

UNITED STATES PATENT OFFICE.

AXEL LEVEDAHL, OF AURORA, ILLINOIS, ASSIGNOR TO AURORA AUTOMATIC MACHINERY COMPANY, OF AURORA, ILLINOIS, A CORPORATION OF ILLINOIS.

DRIVING-GEAR FOR MOTOR-CYCLES.

No. 899,746.　　　Specification of Letters Patent.　　　Patented Sept. 29, 1908.

Application filed January 17, 1908. Serial No. 411,252.

*To all whom it may concern:*

Be it known that I, AXEL LEVEDAHL, a citizen of the United States, and a resident of Aurora, in the county of Kane and State of Illinois, have invented certain new and useful Improvements in Driving-Gears for Motor-Cycles; and I do hereby declare that the following is a full, clear, and exact description thereof, reference being had to the accompanying drawings, and to the letters of reference marked thereon, which form a part of this specification.

This invention relates to improvements in motor-cycles and like chain-driven vehicles and the invention refers more specifically to the mechanism for transmitting driving power from the motor to the driving wheel of the vehicle, to means for adjusting the tension of the driving chains or belts of the chain-driven vehicles, and to means for mounting the motor on the vehicle frame.

The invention consists in the matters hereinafter set forth and more particularly pointed out in the appended claims.

In the drawings:—Figure 1 is a fragmentary side elevation of a motor-cycle, showing my improvements applied thereto. Fig. 2 is a view partially in side elevation and partially in section of the internal combustion motor for driving the vehicle, showing also the manner of fastening the same to the vehicle frame. Fig. 3 is a transverse section, taken on line 3—3 of Fig. 2. Fig. 4 is a transverse section, taken through the hanger-bracket, the hanger-sleeve and crank-shaft. Fig. 5 is a section, taken on line 5—5 of Fig. 4. Fig. 6 is a detail section, taken on line 6—6 of Fig. 4. Fig. 7 is a perspective view of an expansible friction sleeve for locking the hanger-sleeve in the hanger-bracket. Fig. 8 is a perspective view of a nut for expanding said sleeve. Fig. 9 is a detail section, taken on line 9—9 of Fig. 2. Fig. 10 is a detail section, taken on line 10—10 of Fig. 2. Fig. 11 is a detail section, taken on line 11—11 of Fig. 12. Fig. 12 is a detail section, taken on line 12—12 of Fig. 3. Fig. 13 is an axial section of the caging-ring for the bearing shown in Fig. 2. Fig. 14 is a perspective view of one of the members of said caging-ring.

As shown in the drawings, 9 designates one of the rear fork-arms of the frame, and 10 one of the rear braces joined to the rear end of the fork-arm 9 by a familiar form of fitting 11, which latter is adapted to receive the shaft of the rear wheel.

12 indicates the seat post member of the frame; 13 the front strut, and 14 the hanger-bracket, located at the junction of the fork-arms, seat post member and the strut 13. The said strut 13 is curved downwardly forward of the bracket-hanger, to form a cradle 15 over which the motor is supported, the curvature of the cradle corresponding generally to the bottom curvature of the motor crank-casing.

16 designates the rear or driving wheel of the machine, the hub 18 of which is rotatively mounted on the rear axle 17 which is fitted, in the usual manner, to the brackets 11 at the junction of the bottom fork and rear brace.

19 designates, as a whole, an internal combustion motor for driving the vehicle, and 20 designates a crank-shaft provided with the usual crank-arms 21 and carrying a sprocket-wheel 22.

23 designates a sprocket-chain trained about the sprocket-wheel 22 and about a sprocket-wheel (not shown) carried by the rear wheel hub, whereby power is transmitted to the rear or driving wheel from the crank-shaft to drive the machine.

24 designates a sprocket-chain which is trained about a sprocket-wheel 25 mounted on the rear wheel hub, and a sprocket-wheel 26 mounted on the motor casing and driven by the motor. The sprocket wheels over which the drive chains are trained at the rear wheel axle are mounted on the hub 18 in which the axle 17 is concentrically mounted, and said hub and sprocket-wheels are so arranged as to permit the rear wheel to be driven by the motor while the crank-shaft remains stationary, or to be independently driven by the crank-shaft when the motor is not in use, and also to enable the motor to be operated, from the crank-shaft, through said chains and rear sprockets to produce the initial compression to start the motor.

My improvements in the power transmission mechanism for driving the rear or driving wheel from the motor embody speed reducing mechanism for suitably reducing the speed of the motor before applying the power to the driving wheel, and said improvements embrace features of construction associated with the motor itself, designed to simplify and render more compact the construction and arrangement of the speed reducing mechanism and to strengthen the same to withstand the load or strain imposed thereon, due to the high speed of the motor. Referring now to the illustrated construction of this feature of my invention and the parts of the machine associated therewith, the same are made as follows: 30, 31 designate the two members of the crank casing of the motor, and 32 designates the explosion cylinder. Said members of the crank casing have rib and groove connection at their meeting margins, and are fastened together by means of bolts 33, 33, shown in full and dotted lines in Fig. 2. 34, 35 designate two parallel crank-disks located closely side by side in said casing. They are made massive to serve as balance fly-wheels for the motor. 36, 37 designate short, axially alined shaft sections which are centrally fixed to said crank-disks and are rotatively mounted in the casing walls. 38 designates a shaft section arranged eccentrically to the shaft sections 36 and 37 and which extends between and is fixed to the crank-disks. The disks 34 and 35 and shaft sections 36, 37 and 38 constitute the essential elements of a crank-shaft, the section 38 constituting the crank pin thereof, with which is connected the piston rod 39 of the motor, in a familiar manner. The said shafts 36, 37 and 38 are tapered in their parts which engage the crank-disks and the openings in said disks are correspondingly tapered, and said sections are locked to said crank-disks by nuts 40 which engage the screw-threaded ends thereof to clamp the conical or tapered parts of the shaft sections against the tapered walls of the openings in the disks. The nuts 40 are locked to the threaded ends of the shafts by means of apertured locking plates 41 having openings made of a shape and dimension to fit over the nuts, and said plates are secured to the flat faces of the crank-disks by screw-bolts 42.

The bearing end of the shaft section 36 is rotatively mounted in a boss 45 of one wall 31 of the crank casing and said shaft section is provided with an annular collar or shoulder 46 which engages an inwardly facing depressed seat on the inner face of the casing wall. The shaft section 37 extends through and beyond the opposite wall 30 of the casing and engages antifriction bearings mounted in said wall. The outer end of the shaft section 37 extends into a gear chamber formed within or surrounded by an annular flange 47 which extends laterally from the wall 30 of the gear casing.

The antifriction bearing for the shaft section 37 comprises a bearing bushing 50 which fits closely in the opening in the casing wall 30 through which the shaft section extends. The inner end of the bushing is engaged by the outer face of the adjacent crank-disk, whereby, when the parts are assembled, the bushing is held in place. Interposed between the cylindric exterior surface of the shaft section 37 and the inner cylindric surface of the bushing are a plurality of cylindric rollers 52. These rollers are confined by a cage comprising two like rings 54, 54 placed side by side, and each made of a lateral width less than the length of the rollers. Said cage members are provided with a plurality of angularly separated, inwardly opening, cylindric recesses 55, of less length than the lateral thickness of the members, which register when the cage members are fitted together to form roller pockets closed at both ends by end walls 56. Said recesses or pockets are of greater diameter than the radial thickness of the rings, whereby the rollers seated therein project with their cylindric surfaces radially inside and outside the rings for engagement with the inner and outer cylindric bearing surfaces. The rollers are inserted in the recesses of one of the cage members and the cage members are thereafter fitted together, after which the assembled device may be inserted in the bearing bushing.

The shaft section 37 carries at its outer end a pinion 60 which meshes with an internally toothed gear-wheel 61 which is rotatively mounted within the gear-chamber or the space surrounded by said flange 47, and carries the motor-driven sprocket-wheel 26 about which the sprocket-chain 24 is trained. The said gear-wheel comprises a ring portion 62 which carries on its inner surface the gear-teeth and a web portion 63 which is provided with a central bearing opening surrounded by a hub 64 on which the sprocket-wheel 26 is fixed, as by the screw-threads shown. The gear-wheel is centrally mounted on a stud 65 fixed to and extending laterally from a thickened portion 66 of the side wall 30 of the crank casing, and is also supported at its periphery by an annular bearing arranged just within the annular flange 47. The said stud 65 is provided at its inner end with a head and is fixed in place by means of a nut 67 which has screw-threaded engagement with the outer end of the stud and bears against the outer face of the enlarged or thickened portion 66 of the casing wall. The central and peripheral bearings of the gear-wheel are antifriction bearings. Said central bearing embraces an inwardly facing conical ring 71 fixed on the stud 65, and balls 72 interposed between said conical ring, and an annular bearing surface within the hub 64. The conical bearing ring has screw-threaded engagement with the stud and is locked thereon by a screw-threaded lock-nut 73. The outer end of the hub 64 is closed to protect the antifriction bearings from dust by a screw-cap 75 which is provided with a radial flange 76 that overlaps the outer end face of the hub and forms the dust-tight joint required. The outer or peripheral bearing for said gear-wheel 61 comprises a series of anti-friction rollers or balls 80 which are interposed between an outer bearing ring 81 fitted in the angle between the flange 47 and the side wall of the crank-casing, and a transversely concave, annular opposing bearing surface formed on the ring member of said gear-wheel. A dust-guard ring 85 is applied to the joint between the periphery of said gear-wheel and the surrounding flange 47, said ring being herein shown as attached to the flange by screw-bolts 86 and extending radially inwardly therefrom and overlapping a radial flange 87 on the periphery of said gear-wheel. The balls of said central and peripheral bearings are held in place and separated from each other by cage-rings of any preferred form.

It will be observed that I have provided an exceedingly simple and compact speed reducing gear mechanism for reducing the speed transmitted by the motor to the rear or driving wheel of the machine. Said mechanism occupies but little space and is so arranged as to possess great strength and durability and is capable of being readily assembled and dismembered. Moreover, the mechanism is concealed and is protected from dust and grit.

Referring now to the means for fastening the motor on the frame, it will be observed that in the complete machine of the type shown said motor is fastened to the frame at three different points, to wit,—at the top of the cylinder and at the front and rear sides of the crank casing. I have, however, shown only the lower fastening devices inasmuch as I do not contemplate departing from the present practice in the mode of making the upper or top attachment. The fastening devices by which the crank casing of the motor is attached to the frame are located at the front and rear of the casing, the rear side of the crank casing being attached to the hanger bracket and the forward side thereof being attached to the front frame strut above the cradle 15 thereof.

The rear fastening device is best shown in Figs. 2 and 11 and consists of two lugs 90, 90 formed integral with and extending rearwardly from the two members of the crank casing and a lug 91 formed integral with and extending forwardly from the hanger bracket 14. Said lugs fit in overlapping relation, the crank casing lug above the hanger bracket lug, as herein shown, and are detachably and rigidly secured together by means of bolts 92, 92 which extend through registering openings therein.

The front fastening device for the motor comprises two laterally separated curved bars or plates 95, 95 located in front, and one at each side, of the casing. They are attached at both their ends to the casing by means of bolts 96, 96 extending through narrow overlapping flanges 97 on the casing at the meeting edges thereof and through openings in the ends of said plates. The said bars or plates are connected centrally thereof by means of a bolt 98 with a divided or split clamping fitting 99 which is secured to the strut member 13. Said fitting comprises a loop or ring 100 which embraces said strut member and a divided lug 101, the parts of which are made integral with and extending rearwardly therefrom and arranged transversely to the strut member. Said bolt 98 extends through an axial opening in said divided lug and registering openings in the plates 95, as shown in Fig. 10, and serves both to clamp the fitting to the strut member and to attach the motor casing to the fitting. It will be observed that the connection described between the motor casing and strut member is such that the casing may swing vertically relatively to the frame when the rear or hanger bracket attaching devices are free, which facilitate the fitting of the rigid parts together.

In accordance with one feature of my invention, means are provided for separately adjusting the tension of the driving chains 23 and 24 with respect to each other, thereby permitting an accurate adjustment of both chains regardless of the tendency of said chains to become unequally elongated due to stretching of the chains and the wear on the links thereof. The tension of the motor driving chain 24 is adjusted by a familiar form of chain adjusting device carried by the junction fitting 11 at the intersection of the bottom fork 9 and rear brace 10. Said adjusting device comprises a washer 105 which surrounds the end of the rear wheel shaft 17 and an adjusting screw 106 which has screw-threaded engagement with a lug 107 carried by the junction fitting 11. Two of said chain adjusting devices are, of course, provided, one at each end of the shaft, and both of said junction fittings 11 are provided with the usual rearwardly opening slots 109 which receive the rear axle and permit said axle and the rear wheel hub to be forced rearwardly, through the action of the adjusting screws 106, to tighten the chains in the usual manner. Such action of the adjusting devices described serves to tighten both chains simultaneously. Inasmuch, however, as the chains are subjected to different working stresses, which tend to unequally stretch the same, and inasmuch, further, as no two chains, even when operating under like conditions of working stress will wear alike, it becomes desirable to provide means for adjusting each chain separately to maintain the same under proper tension.

The action of the adjusting screws described is relied upon to maintain proper adjustment of the motor driving chain 24, and separate adjusting means is provided at the crank-shaft for adjusting the tension of the crank-shaft chain. In the present instance, such adjustment of the crank-shaft chain is effected by mounting the crank-shaft eccentrically in the hanger-bracket 14 and supporting the crank-shaft therein in such manner that it may be angularly adjusted with respect to the axis of the bracket for varying the distance between said shaft and rear axle and correspondingly varying the tension of the crank-shaft chain. When adjusting the chains, therefore, the motor-driven chain is first adjusted to the desired tension by the rear axle adjustment, after which the crankshaft driven chain may be adjusted without interfering in any manner with the adjustment of the other chain.

An approved construction for effecting the adjustment of the crank-shaft chain is shown in detail in Figs. 4 to 8, inclusive, and is made as follows: The hanger-bracket 14 consists of a closed tube which receives and supports the hanger-sleeve 115 in which the crank-shaft 20 is rotatively mounted. The said hanger-sleeve 115 extends at its ends beyond the hanger-bracket and is arranged eccentrically in said bracket. Such eccentric mounting of the hanger-sleeve within the bracket is effected by providing the hanger-sleeve with radial, eccentric, cylindric flanges 116, 117 which fit closely within the cylindric ends of the hanger-bracket. The crank-shaft is contained within a bearing sleeve 118, between annular, exterior bearing surfaces at the ends of which and bearing rings 119 fitted in the ends of the sleeve 115 are interposed antifriction bearing balls 120. The crank-shaft, which may be of any preferred construction, comprises, as herein shown, two tubular sections which are joined along oblique meeting faces and are fastened together by a bolt 122 within and fixed to one of said sections and extending through the other section and its associated crank and is provided at its exposed end with a screw-threaded nut 123. The said hanger-sleeve and the parts carried thereby are capable of being rotated in the hanger-bracket about an axis concentric with the sleeve flanges 116 and 117, and when so rotated the hanger-sleeve and crank-shaft are angularly displaced or shifted, as will be apparent from an inspection of Figs. 1 and 4. Such angular displacement of the crankshaft varies the distance between the same and the rear wheel axle with the effect of varying the tension of the chain 23. The said hanger-sleeve is locked in the hanger-bracket by devices made as follows: 130 designates a thin metal sleeve which surrounds the hanger-sleeve between the eccentric flanges 116 and 117 thereof and fits closely against the cylindric inner surface of the hanger-bracket. The said sleeve is split or divided at its lower side and is attached at its upper side to the hanger-sleeve, as by means of screws 131, 131. An expanding device is located within the hanger-bracket and engages the longitudinal margins of the sleeve at the split portion thereof in a manner to spread or expand said sleeve into close frictional contact with the inner cylindric surface of the hanger-bracket, and thereby lock the expansible sleeve securely to the hanger-bracket. When the sleeve is so locked to the hanger-bracket it serves to fixedly secure the hanger-sleeve within said bracket by reason of its attachment to the hanger-sleeve, as by the screws 130. The means herein shown for thus spreading or expanding said locking sleeve consists of an elongated screw-threaded nut 135 which is located in the expansible sleeve below the hanger-sleeve and is provided on its lower surface with a rib 136 having oppositely inclined or wedge-shaped margins 137 which engage the correspondingly inclined margins of the expansible sleeve. The said block is moved longitudinally of the expansible sleeve by means of a screw-threaded shaft 138 which extends through the axial screw-threaded opening 139 of the nut and has bearing at its opposite ends in the wider lower parts of the eccentric flanges 116 and 117 of the hanger-sleeve. The said screw-threaded shaft is reduced at its ends to provide bearing trunnions 140, 140 which engage bearing openings in said eccentric flanges, and to also provide outwardly facing shoulders which engage the inner faces of the flanges to hold the shaft from endwise movement. The shaft is provided at one end with a head 141 by which it may be rotated in its bearings. The said expanding device, consisting of the elongated nut 135 and the screw-threaded shaft 138, are mounted in the expansible sleeve before the hanger-sleeve 115 is inserted into the hanger-bracket, the inclined margins of the expansible sleeve 130 being spread apart to permit the nut to pass between them into the said sleeve, with the inclined or wedge-surfaces 137 thereof engaging with the inclined margins of the sleeve. The shaft bearing opening of one of the eccentric flanges, to wit,—the flange 117 is formed with a downwardly opening slot 143 through which the associated end of the shaft may enter its bearing. The opposite end of said shaft is first inserted into its bearing opening in the flange 116 at a time when the sleeve 130 is spread open to admit the nut, and the headed end of said shaft is thereafter lifted upwardly to pass its bearing trunnion through the slot 143 to its bearing opening. The said hanger-sleeve and the expansible locking ring may be rotated in the hanger-bracket by means of a spanner or like implement arranged to engage with spanner-holes 144 in one of said flanges, the flange 116 as shown in Figs. 1 and 4.

I claim as my invention:—

1. A driving gear mechanism for motor cycles comprising, in combination with the motor, its crank-shaft and its casing wall provided with a bearing for the crank-shaft, a gear pinion on the crank-shaft exterior to the crank-shaft bearing, a bearing stud extending outwardly from said casing wall, a gear wheel meshing with said gear pinion having central bearing engagement with said bearing stud and peripheral engagement with said casing wall, and a driving gear affixed centrally to the outer face of said gear wheel.

2. A driving gear mechanism for motor cycles comprising, in combination with the motor, its crank-shaft and its casing wall provided with a bearing for the crank-shaft, a gear pinion on the crank-shaft exterior to the crank-shaft bearing, a bearing stud extending outwardly from said casing wall, an internally toothed gear wheel meshing with said pinion having central bearing engagement with the bearing stud and peripheral bearing engagement with the said casing wall, and a driving gear affixed centrally to said gear wheel.

3. A driving gear mechanism for motor cycles comprising, in combination with the motor, its crank-shaft and its casing wall provided with a bearing for the crank-shaft, a pinion on the crank-shaft exterior to the shaft bearing, a bearing stud extending outwardly from the casing wall, an annular flange extending from said casing wall concentrically with the stud to form a gear chamber, an internally toothed gear wheel located within said gear chamber and meshing with said pinion, said gear wheel having central bearing engagement with the said bearing stud and peripheral bearing engagement with the casing wall inside of said annular flange, said gear wheel being arranged to close the laterally outer side of the gear chamber, and a driving gear affixed centrally to the outer face of said gear wheel.

4. A driving gear mechanism for motor cycles comprising, in combination with the motor, its crank-shaft and its casing wall provided with a bearing for the crank-shaft, a pinion on the crank-shaft exterior to the shaft bearing, a bearing stud extending outwardly from the casing wall, an internally toothed gear wheel meshing with said gear pinion, an antifriction ball bearing between the said gear wheel and the bearing stud, an antifriction ball bearing between the periphery of the said gear wheel and the casing wall, and a driving gear affixed centrally to said gear wheel.

5. A driving gear mechanism for motor cycles comprising, in combination with the motor, its crank-shaft and its casing wall provided with a bearing for the crank-shaft, a pinion on the crank-shaft exterior to the shaft bearing, a bearing stud extending outwardly from the casing wall, an internally toothed gear wheel meshing with said pinion and provided with a hub which surrounds said bearing stud, an antifriction bearing between said stud and the gear wheel hub, comprising a conical bearing member applied to said stud, and a plurality of antifriction balls interposed between said conical bearing member and an opposed annular bearing surface of the hub, an annular antifriction bearing between the periphery of said gear wheel and said casing wall, and a driving gear affixed to the hub.

6. A driving gear mechanism for motor cycles comprising, in combination with the motor, its crank-shaft and its casing wall provided with a bearing for the crank-shaft, a pinion on the crank-shaft exterior to the shaft bearing, a bearing stud extending outwardly from the casing wall, a rotative, internally toothed gear wheel meshing with said pinion and provided with a central hub, an antifriction bearing between said stud and gear wheel hub comprising a conical bearing member fixed to said stud, and antifriction balls interposed between said conical bearing member and an opposed annular bearing surface of the hub, a dust cap affixed to and closing the outer end of said hub, an annular antifriction bearing between the periphery of said gear wheel and said casing wall, and a driving gear affixed to the hub.

7. A driving gear mechanism for motor cycles comprising, in combination with the motor, its crank-shaft and its casing wall provided with a bearing for the crank-shaft, a pinion on the crank-shaft of the motor exterior to the casing wall, a bearing stud extending outwardly from the casing wall, an internally toothed gear wheel provided with a central hub which has bearing on said stud, a closed annular flange extending outwardly from said wall concentrically with said bearing stud and surrounding said gear wheel, a stationary annular bearing ring supported by said casing wall and flange, antifriction rollers interposed between a peripheral annular bearing surface on said gear wheel and said bearing ring, a dust ring affixed to said flange and overlapping the marginal part of said gear-wheel, and a driving gear affixed to the hub of the gear wheel.

8. In a driving gear for motor cycles, the combination with the frame, a rear wheel hub rotatively mounted in said frame, and a motor mounted on said frame, its crank-shaft, and its casing wall provided with a bearing for said crank-shaft, of a gear pinion on the crank-shaft exterior to said bearing, a bearing stud extending outwardly from the casing wall, a rotative, internally toothed gear wheel meshing with said pinion and having central bearing engagement with said bearing stud, and having peripheral bearing engagement with the casing wall, a sprocket wheel affixed centrally to the said gear wheel, and a sprocket chain trained about said sprocket wheel and a sprocket wheel on said rear wheel hub.

9. In a motor cycle, the combination with the machine frame embracing a downwardly and rearwardly inclined forward strut member and a hanger bracket to which the said forward strut member is attached at its rear end, and a motor casing located forward of the hanger bracket and above the lower, rear end of the strut member, said rear end of the strut member having a downwardly curved portion which extends beneath the motor casing and below the level of the hanger bracket, and the motor casing being attached at its rear part to the hanger bracket and at its forward part to the said strut member forward of the said downwardly curved portion thereof.

10. In a motor cycle, the combination with the frame embracing a forward, downwardly and rearwardly inclined strut member, and a hanger bracket to which the strut member is attached at its rear end, and a motor casing located forward of the hanger bracket and over the lower rear part of the strut member, of means for securing the motor casing to the frame embracing front and rear attaching devices on the motor casing, a lug on the hanger bracket to which the rear attaching device is secured, and a sleeve affixed to said strut member forward of the casing to which the front attaching device on said casing is secured, the attaching device at the front side of the motor casing having pivotal connection with said sleeve on said strut member.

11. In a motor cycle, the combination with a frame embracing a forward, downwardly and rearwardly inclined strut member, a hanger bracket to which said strut member is attached at its rear end, and a motor casing located forward of said hanger bracket and over the lower, rear part of the strut member, of means for securing said motor to the frame embracing a lug on the hanger bracket, an attaching device on the rear side of the motor casing, attached to said lug, a split clamping sleeve applied to said strut member forward of the motor casing, said clamping sleeve having two separated lugs, two vertically arranged plates attached at their ends to the front side of the motor casing, and a bolt inserted through said lugs and through said plates between the ends of the latter; said bolt acting to clamp the sleeve to the strut member and to afford a pivotal connection between the said plates and the sleeve.

In testimony, that I claim the foregoing as my invention I affix my signature in the presence of two witnesses, this 2nd day of January A. D. 1908.

AXEL LEVEDAHL.

Witnesses:
W. W. ARMSTRONG,
E. D. GRAY.